Figure 1:
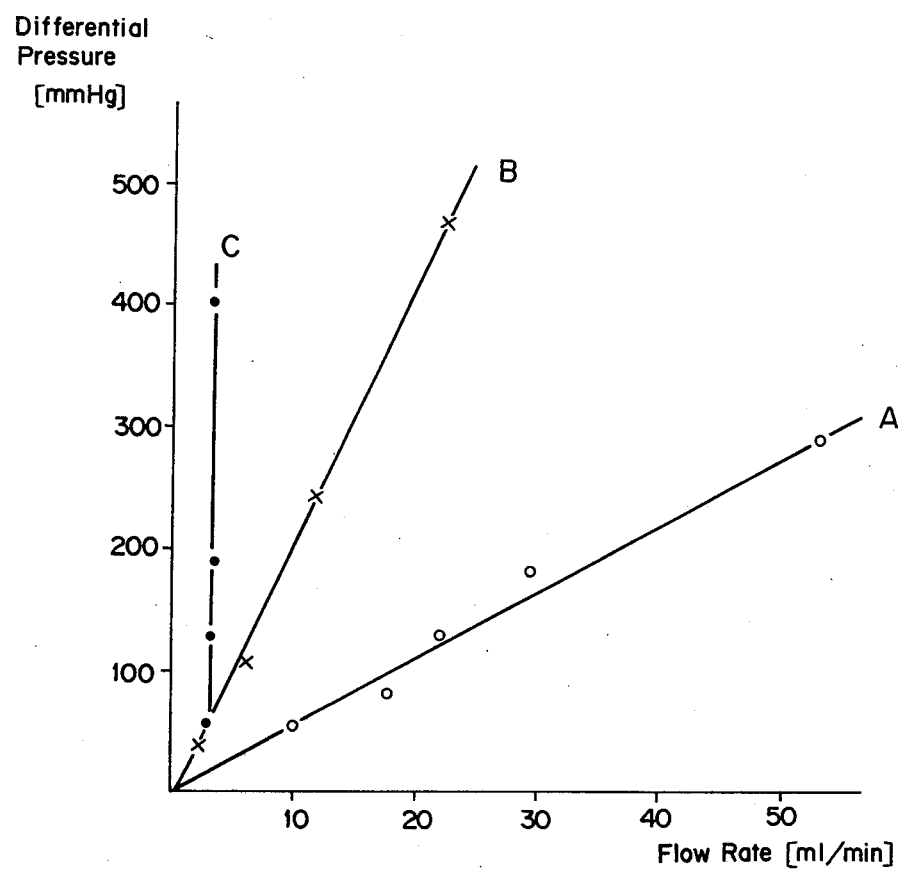

United States Patent [19]

Uchida et al.

[11] 4,452,918

[45] Jun. 5, 1984

[54] TOTALLY POROUS ACTIVATED GEL

[75] Inventors: Takateru Uchida, Meguro; Kohji Noguchi, Yokohama; Takao Kiyota, Fuji, all of Japan

[73] Assignee: Asahi Kasei Kogyo Kabushiki Kaisha, Osaka, Japan

[21] Appl. No.: 374,369

[22] Filed: May 3, 1982

[30] Foreign Application Priority Data

May 18, 1981 [JP] Japan .................................. 56-73387

[51] Int. Cl.$^3$ ...................... C08F 8/12; C08F 226/00; B32B 3/00
[52] U.S. Cl. ........................................ 521/52; 521/53; 521/55; 521/141; 521/905; 428/402; 210/656
[58] Field of Search ........................ 521/52, 53, 55, 95, 521/140, 141, 905; 428/402; 210/635, 656

[56] References Cited

U.S. PATENT DOCUMENTS

| | | | |
|---|---|---|---|
| 3,788,948 | 1/1974 | Kagedal et al. | 195/68 |
| 4,314,032 | 2/1982 | Murayama et al. | 521/52 |
| 4,339,500 | 7/1982 | Yanagihara et al. | 128/402 |
| 4,368,275 | 1/1983 | Yanagihara et al. | 521/52 |

FOREIGN PATENT DOCUMENTS 6199 9/1980 European Pat. Off. .

OTHER PUBLICATIONS

Journal of Chromatography, 1974, pp. 87–98.
Biochemical and Biophysical Research Communications, vol. 84, 9/14/78, pp. 7–14.
Japanese Kokai No. 54–160300, 12/18/79, pp. 553–564.
Japanese Kokai No. 49–28031, 7/23/74, pp. 185–190.
Catalogue of "Toyopearl".

*Primary Examiner*—John Kight, III
*Assistant Examiner*—Nathan M. Nutter
*Attorney, Agent, or Firm*—Sprung, Horn, Kramer & Woods

[57] ABSTRACT

A totally porous activated gel which comprises a matrix of a totally porous crosslinked copolymer comprising as main components vinyl alcohol monomer units and crosslinkable monomer units and having a specific surface area of 5 to 1000 m$^2$/g and an reactive group linked to said matrix by a covalent bond. The present activated gel is very useful for effectively separating bio-substances due to the peculiar behavior of the reactive group of the activated gel. The activated gel is rigid, and is excellent in mechanical strength, resistance to chemicals, high pH, low pH, high temperature and low temperature, and is very effective in specific adsorption of bio-substances. The activated gel can be subjected to freeze-drying sterilization, heat sterilization and radiation sterilization, so that it can be utilized for the medical treatment by extracorporeal perfusion of, for example, blood.

21 Claims, 2 Drawing Figures

TOTALLY POROUS ACTIVATED GEL

This invention relates to a totally porous activated gel. More particularly, this invention is concerned with a totally porous activated gel which comprises a matrix of a totally porous crosslinked copolymer comprising as main components vinyl alcohol monomer units and crosslinkable monomer units and a reactive group linked to said matrix, and a process for preparing such a totally porous activated gel.

In the field of biochemistry, it is an important task to isolate the intended protein, enzyme or other bio-substance from a mixture containing such a substance. Heretofore, various reasearchers have been made to develop an improved isolation method for various bio-substances.

Various methods are known to isolate the intended bio-substance. For example, there are methods to isolate the intended bio-substance, utilizing (1) the solubility difference, (2) electric charge difference, (3) molecular size and configuration differences and (4) physical and chemical affinity differences. Besides these conventional methods, there is also a known method which utilizes the biological specific affinity to isolate, separate or purify the intended bio-substance. This method is widely used because it ensures higher specificity than the other conventional methods. In particular, the Affinity Chromatography method, in which one of the substances exhibiting affinity with each other is fixed to an insoluble matrix and the other of the substances is specifically separated, is most widely used owing to the handling easiness (see, for example, Ichiro Chibata, et al. "Affinity Chromatography", published by Kodansha K.K., Japan in 1976).

The most desirable method to insolublize a substance exhibiting biological affinity is a method in which the substance is fixed to an insoluble activated gel by a covalent bond. In this method, there is needed an activated gel which is a gel having a reactive group linked thereto by a covalent bond, said reactive group being capable of effecting addition or substitution reaction with a nucleophilic, active hydrogen-having reactive group of the substance, such as an amino group, a carboxyl group, a hydroxyl group or a thiol group, to form a covalent bond between the reactive group and the nucleophilic, active hydrogen-having reactive group.

In general, the activated gels to be used for separating bio-substances utilizing the biological affinity between substances should have the following characteristics:

(1) the gels are capable of bonding thereto a bio-substance exhibiting biological affinity without causing its biological affinity to be lost;

(2) the gels contain reactive groups at high concentration so that an increased amount of bio-substance can be bonded to the gels;

(3) the gels do substantially not show non-specific adsorption of bio-substance so that the intended substance only can be specifically adsorbed thereto;

(4) the gels can sustain their original mechanical strength and pore structure without being affected by the solvent, modifying agent, pH and temperature employed in bonding a bio-substance to the gel matrix, or in contacting a bio-substance mixture with the bonded bio-substance to cause a bio-substance exhibiting biological affinity with the bonded bio-substance to be fixed to the bonded bio-substance while allowing the other bio-substances not exhibiting biological affinity with the bonded bio-substances to flow out, or in eluting the bio-substance fixed to the bonded bio-substance due to the affinity the therebetween;

(5) the gels are porous so that physiological substances, such as amino acid, protein, polypeptide and the like, can be sufficiently diffused within the gel matrix;

(6) the gels can be stored without rotting; and (7) the gels have sufficient mechanical strength so that they are not destroyed during the step of gel activation, viz. incorporation of reactive groups onto the gel matrix, and the step of bonding a bio-substance to the gels.

Affinity chromatography is often conducted by incorporating gels in a column. In this instance, the gels are required to have sufficient mechanical strength so that liquid can be passed at a high speed.

Furthermore, the gels may be freezed-dried and subjected to ethylene oxide sterilization, or may be directly subjected to heat sterilization or radiation sterilization according to the mode of application. It is desirable that the chemical and physical structure of the gels will not break down during the steps of freeze-drying and sterilization.

Heretofore, as the gels to be used for separating bio-substances utilizing affinity between substances, there have been proposed gels obtained by activating a natural isoluble carrier, such as agarose or cellulose, with cyanogen bromide. Especially, gels derived from agarose are being widely used [see, (1) L. Sundberg & J. Porath, J. Chromatography, 90, 87 (1974); (2) Japanese Patent Application Publication Specification No. 28031/1974]. Gels of this kind are available, for example, under the trade name of Sepharose manufactured and sold by Pharmacia Fine Chemicals, Inc., Sweden.

However, gels derived from agarose have a serious drawback that they are insufficient in mechanical strength so that the pores of the gels are likely to collapse during the step of gel activation, viz. incorporation of reactive groups onto the gel matrix, and the step of bonding a bio-substance to the gels, and that a liquid mixture containing a bio-substance to be separated cannot be passed at a high speed through the column when the gels are used in a column. Gels derived from agarose have another serious drawback that the pores of the gels collapse due to freeze-drying and they cannot be restored even if the gels are again disperesed in an aqueous solvent, and that heat or radiation sterilization cannot be applied to the gels because such sterilization causes the pore structure of the gels to be destroyed. The above-mentioned drawback that heat or radiation sterilization cannot be applied to the gels is fatal when the gels are intended to use for the medical treatment by extracorporeal perfusion of blood to remove harmful matter therefrom.

As gels improved in mechanical strength as compared with those derived from agarose as described above, it was proposed in Japanese Patent Application Laid-Open Specification No.160300/1979 (corresponding thereto, U.S. Pat. Nos. 4,246,362, 4,256,842 and 4,256,843) to use a semi-rigid hydrophilic synthetic polymer gel of a polyvinyl polymer containing pendant primary hydroxyl groups. Gels as disclosed in the above-mentioned Patent application can be used for the affinity chromatography. Whilst the gels are improved in mechanical strength as compared with those derived from agarose, they are still insufficient in mechanical strength. Further, the semi-rigid gels have not sufficient porosity.

Therefore, there is a strong demand in the art for activated gels useful for effectively separating bio-substances utilizing affinity between substances, which are free from the above-mentioned drawbacks.

We have made intensive studies to develop activated gels as strongly demanded in the art as mentioned above. As a result, we have found that a totally porous activated gel which comprises a matrix of a totally porous crosslinked polymer comprising as main components vinyl alcohol monomer units and crosslinkable monomer units and having a specific surface area of 5 to 1000 m$^2$/g, and a reactive group linked to said matrix by a covalent bond meets all the requirements for a desirable gel as described above.

Based on this finding, we have completed this invention.

It is, therefore, an object of the present invention to provide an activated gel enjoying the following characteristics:

(1) the gel is capable of bonding thereto a bio-substance exhibiting biological affinity without causing its biological affinity to be lost;

(2) the gel contains reactive groups at high concentration so that an increased amount of bio-substance can be bonded to the gel;

(3) the gel does substantially not show non-specific adsorption of bio-substances so that the intended substance only can be specifically adsorbed thereto;

(4) the gel can sustain their original mechanical strength and pore structure without being affected by the solvent, modifying agent, pH and other surrounding conditions;

(5) the gel is porous so that physiological substances, such as amino acid, protein, polypeptide and the like, can be sufficiently diffused within the gel matrix;

(6) the gel can be stored without rotting;

(7) the gel has sufficient mechanical strength so that they are not destroyed during the steps of gel activation and bonding a bio-substance to the gel;

(8) the gel has sufficient mechanical strength and pore structure so that liquid can be passed therethrough at a high speed;

(9) the gel can be freeze dried; and

(10) the gel can be subjected to ethylene oxide gas sterilzation.

It is another object of the present invention to provide a process for preparing an activated gel of the kind described above.

Figure 2:
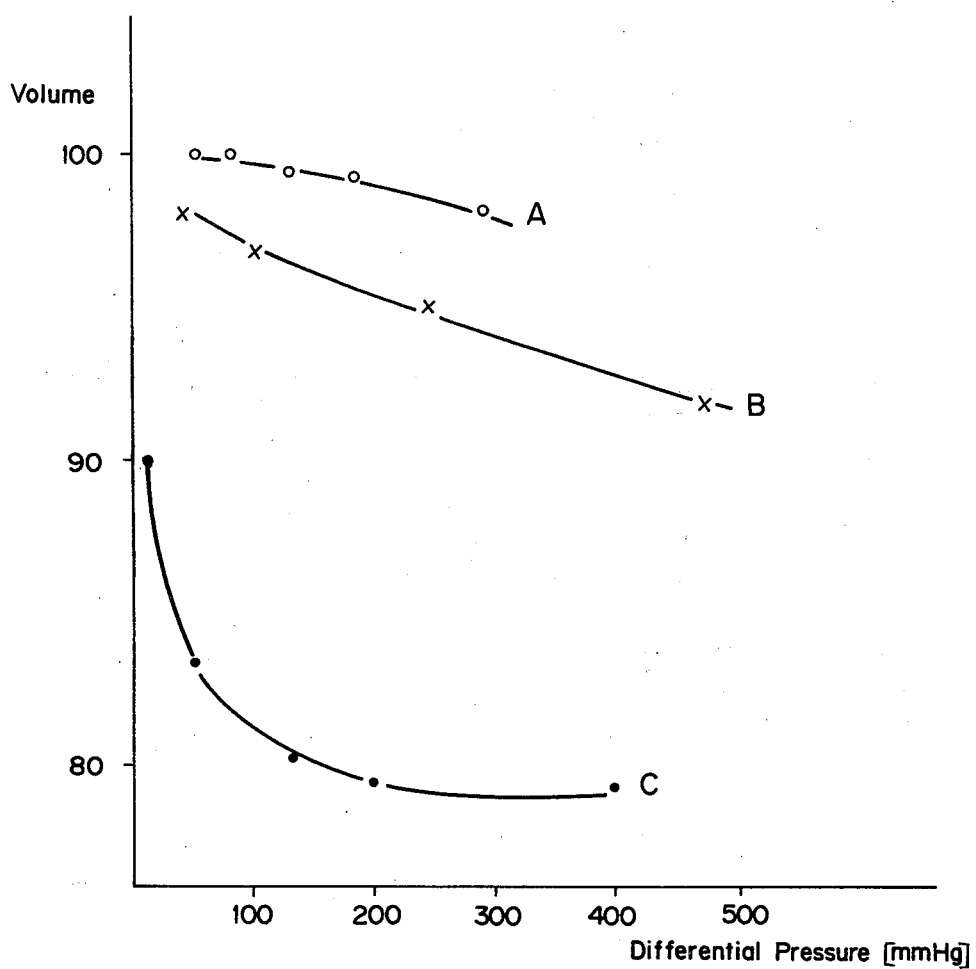

The foregoing and other objects, features and advantages of the present invention will be apparent to those skilled in the art from the following detailed description and appended claims taken in connection with the accompanying drawings in which:

FIG. 1 is a graph showing the relationship between the flow rate of water running through the column and the differential pressure between the inlet and the outlet of the column with respect the columns packed with the gel of the present invention (A), a conventional semi-rigid polyvinyl gel, containing pendant hydroxyl groups, activated with epichlorohydrin (B), and a conventional epoxy activated agarose gel (C); and FIG. 2 is a graph showing the relationship between the volume of the gel and the differential pressure between the inlet and the outlet of the column with respect to the gel samples as mentioned above.

Figures will be referred to later again with respect to Example 9.

In one aspect of the present invention, there is provided a totally porous activated gel which comprises:

a matrix of a totally porous crosslinked copolymer comprising as main components vinyl alcohol monomer units and crosslinkable monomer units and having a specific surface area of 5 to 1000 m$^2$/g, and a reactive group linked to said matrix by a covalent bond, said reactive group being defined as a functional group capable of effecting addition or substitution reaction with a nucleophilic reactive group having an active hydrogen in a medium having a hydrogen ion concentration of 3 to 13 in terms of pH value at a temperature of 0° to 100° C. to form a covalent bond between said reactive group and said nucleophilic reactive group.

The reactive group to be incorporated into the gel of the present invention is needed to effect addition or substitution reaction with such a nucleophilic, active hydrogen-having reactive group such as amino group, carboxyl group, hydroxyl group, thiol grop or the like as contained in a bio-substance having biological affinity. In addition, the reactive group should be stable enough not to vehemently react with water in a wet state, but should be reactive enough to form a covalent bond with a nucleophilic substituent of a bio-substance without blocking the biological affinity of the bio-substance.

As the suitable reactive group to be incorporated into the gel of the present invention, there may be mentioned, for example, imidocarbonate group, a cyanate ester group, an epoxy group containing 3 to 10 carbon atoms, a carbonate group, a bromoacetyl group, a halo-triazine group and an imidazolylcarbamic ester group. Of the above reactive groups, an imidocarbonate group, a cyanate ester group and an epoxy group containing 3 to 10 carbon atoms are preferable.

According to need, a single kind of reactive group may be linked to the gel matrix or a plurality of different kinds of reactive groups may be linked thereto.

It is preferred that the reactive group be incorporated in the gel at high concentration. The gel of the present invention has a reactive group concentration of 300 to 3000 $\mu$mol/g of dry gel, preferably 500 to 3000 $\mu$mol/g of dry gel.

The reactive group concentration in the gel may be determined according to customary procedures. For example, the concentration of cyanate ester groups in the gel may be determined according to the Wilchek et al. method [see Wilchek et al., Biochem. Biophys. Res. Commun., 84, 7 (1978)]. In this method, the gel is reacted with a quantitative analysis reagent prepared from pyridine, concentrated hydrochloric acid and barbituric acid at 40° C. The reaction mixture is filtered, and the absorbance at 575 nm of the filtrate is determined to obtain the concentration of reactive groups in the gel.

The concentration of epoxy groups in the gel may be determined according to the Sundberg et al. method [see L. Sundberg & J. Porath, J. Chromatogr., 90, 87 (1974)]. In this method, the gel is reacted with sodium thiosulfate to liberate hydroxyl ions and the thus liberated hydroxyl ions are titrated with acid.

There is also known a simple method of determining the concentration of reactive groups in the gel in which the gel is contacted with oligopeptide and the amount of oligopeptide adsorbed to the gel is measured to obtain the concentration of reactive groups [see R. Axen & S. Ernback, Eur. J. Biochem., 18, 351 (1971)].

The matrix of the gel of the present invention is composed of a totally porous crosslinked copolymer comprising as main components vinyl alcohol monomer units and crosslinkable monomer units, in which permanent pores are maintained by the crosslinking structural unit. It is preferred that the crosslinking structural unit of the gel matrix in the present invention do comprise, as a crosslinkable monomer unit, a unit derived from a monomer having at least two ethylenically unsaturated double bonds and/or an acetylenically unsaturated triple bond, especially a unit derived from a monomer having at least two vinyl groups and/or allyl groups which are chemically stable and decrease the non-specific adsorption of bio-substances to the gel matrix.

As specific examples of the crosslinkable monomer unit in the matrix of the activated gel according to the present invention, there may be mentioned units derived from triazine derivatives such as triallyl isocyanurate and triallyl cyanurate, di(methy)acrylates such as ethylene glycol dimethacrylate and diethylene glycol dimethacrylate, polyvinyl ethers such as butanediol divinyl ether, diethylene glycol divinyl ether and tetravinylglyoxal, and polyallyl ethers such as diallylidene pentaerythrite and tetraallyloxyethane. They may be employed alone or in mixture. Of the above monomers, triallyl isocyanurate is particularly preferable because it gives a matrix excellent in mechanical strength, fine pore structure and chemical stability. Besides, there may also be used diallyl propargyl cyanurate.

As pointed out hereinbefore, the matrix of the activated gel of the present invention comprises as main components vinyl alcohol monomer units and crosslinkable monomer units. However, the matrix may further comprise other monomer units, for example, vinyl carboxylate monomer units and/or vinyl ether monomer units.

The activated gel of the present invention is totally porous so that it has a large specific surface area in the dry state. By the totally porous structure is meant a structure in which fine pores are distributed throughout the grain of polymer. In general, an organic synthetic polymer comprising a crosslinking structure is swollen in a solvent and shrinks in the dry state. In the soft gel, meshes in the network structure formed by cross-linking serve as the pores. The soft gel has a desired pore size when swollen in a solvent, but in the dry state, the soft gel shrinks so that the pores substantially disappear. When the pores substantially disappear, the specific surface area of the polymer comes to represent only the outer part of the polymer, which is usually less than 1 $m^2/g$. The agarose gel conventionally used as a matrix for affinity chromatography is a soft gel, the pores of which substantially disappear in the dry state. Therefore, it is to be kept in the swollen state in an aqueous solvent. On the other hand, the rigid gel has a structure in which fine hole portions constituting pores and dense skeleton portions are distirubted entirely in the grain. The pore size does substantially not vary whether the gel is in the swollen state or in the dry state. The specific surface area of the rigid gel is usually greater than that of the soft gel. The activated gel of the present invention has a specific surface area of 5 to 1000 $m^2/g$. There are known various methods for the determination of specific surface area. In the present invention, the specific surface area is determined according to the most popular BET method using nitrogen gas. The sample to be used for the determination of specific surface area should be sufficiently dried. The gel of the present invention is high in degree of crosslinking and has a firm porous structure, and hence, even if the gel is immersed in water and then dried, it retains the same specific surface area as that of the polymer prior to the above procedures, that is, immersion in water and the subsequent drying. However, since it is difficult to dry the gel of the present invention because of a high hydrophilic characteristic in order to determine the specific surface area, it is preferred that the gel be first equilibrated with acetone and then dried under reduced pressure at a temperature lower than 60° C.

The water regain $W_R$ of the activated gel of the present invention should be in the range of from 0.5 to 6.0 g/g, preferably from 1.0 to 5.0 g/g. The $W_R$ value is the amount of water that can be contained in the pores of the gel when the gel is equilibrated with water, per unit weight of the gel in the dry state. In short, the $W_R$ value can be a criterion indicating the quantity of pores within the gel. As the $W_R$ value is increased, the weight of the skeleton-constituting portion of the gel in water, namely, the weight of the gel per se, is relatively decreased. Accordingly, if the $W_R$ value is too large, the mechanical strength of the gel is reduced. If the $W_R$ value is too small, since the quantity of pores in the grains is reduced, the separating capacity of the gel is lowered. Therefore, from the viewpoint of the physical properties of the gel, it is preferable that the $W_R$ value be within the above-defined range. The $W_R$ value can be determined by subjecting a gel sufficiently equilibrated with distilled water to centrifugation to remove the water adhering to the surface of the gel, measuring the weight ($W_1$) of the gel, drying the gel, measuring the weight ($W_2$) of the gel after drying and calculating the $W_R$ value according to the following formula:

$$W_R = (W_1 - W_2)/W_2$$

The average grain diameter of the activated gel of the present invention is in the range of 5 to 1000 μm. The average grain size value is determined by using a commercial instrument, such as "Coulter Counter" (trade name of an apparatus manufactured by Coulter Electronics Inc., U.S.A.) or "HIAC PA-720" (trade name of an apparatus manufactured by Pacific Scientific Company Inc., U.S.A.).

As explained hereinbefore, the matrix of the activated gel of the present invention is composed of a totally porous crosslinked copolymer comprising, for example, vinyl alcohol monomer units, vinyl carboxylate monomer units and units derived from the aforementioned crosslinkable monomer, namely, a monomer having at least two ethylenically unsaturated double bonds and/or an acetylenically unsaturated triple bond. Such a matrix of the activated gel of the present invention may preferably have a degree of crosslinking ($X_1$) in the range satisfying an inequality $0.1 \leq X_1 \leq 0.4$, more advantageously $0.15 \leq X_1 \leq 0.3$, said degree of crosslinking ($X_1$) being defined by the formula $$\frac{n_2 c}{a + n_1 b + n_2 c}$$

in which
a represents the number of moles of said vinyl alcohol monomer units, b represents the number of moles of said vinyl carboxylate monomer units, c represents the number of moles of said crosslinkable monomer units, $n_1$ represents the number of vinyl groups present in said vinyl carboxylate monomer units, and $n_2$ represents the number of ethylenically unsaturated double bonds and acetylenically unsaturated triple bonds present in said crosslinkable monomer units.

As also mentioned hereinbefore, the matrix may further comprise other monomer units which do not adversely affect the physical characteristics of the activated gel of the present invention, such as a vinyl ether monomer unit. The vinyl ether monomer unit may usually be contained in the matrix up to 3 mole % based on the total of the monomer units constituting the gel matrix.

The vinyl alcohol monomer units in the matrix are derived by saponification or ester interchange of the vinyl carboxylate monomer units contained in the copolymer obtained by suspension polymerization of a vinyl carboxylate monomer and a crosslinkable monomer, as described later. The greater the content of vinyl alcohol monomer units in the matrix, the greater the concentration of reactive groups incorporated in the gel of the present invention. Besides, the gel is rendered hydrophilic by the hydroxyl groups of vinyl alcohol monomer units. In the matrix of the activated gel of the present invention, it is preferred that the concentration of vinyl alcohol monomer units (hereinafter referred to as "$q_{OH}$"), i.e. the number of vinyl alcohol units per g of the matrix, be at least 5 milliequivalents/g (hereinafter referred to as "meq/g") but not exceeding a value given by the formula $$\frac{1000(1 - X_1)}{44 + 39X_1}$$

in which $X_1$ is as defined above and in the range satisfying an inequality $0.1 \leq X_1 \leq 0.4$.

If the $q_{OH}$ value exceeds the upper limit, the mechanical strength of the gel is reduced, and if the $q_{OH}$ value is smaller than the lower limit, the hydrophilic characteristic of the gel is lost. Incidentally, the $q_{OH}$ value can be determined by reacting the gel with acetic anhydride in a pyridine solvent, measuring the amount of acetic anhydride consumed for the reaction with the hydroxyl groups and calculating the concentration of the vinyl alcohol monomer units from this measured value. For example, when 1 millimole of acetic anhydride is consumed for the reaction with 1 g of a dry gel, the $q_{OH}$ value of this gel is 1 meq/g.

Affinity chromatography is usually employed to separate, purify or isolate high molecular weight molecules. Accordingly, the gels to be used for affinity chromatography should exhibit a high value of "Mlim" which indicates the lower limit of the molecular weight of a molecule which cannot permeate into the pores of the gel. Substances having a molecular weight higher than this critical value cannot permeate into the pores of the gel but pass directly through clearances among the grains. The Mlim value of the matrix of the activated gel of the present invention is in the range of $10^3$ to $10^8$. The Mlim value can be obtained from the calibration curve of GPC. The calibration curve can be obtained by plotting measurement data of samples having known molecular weights on a graph in which the elution capacity of a gel-packed column is shown on the abscissa and the logarithm of the molecular weight is shown on the ordinate, and this calibration curve comprises a line substantially parallel to the ordinate and a subsequent line of a negative gradient.

In determination of the Mlim value in the present invention, polyethylene glycol or dextran is used as the reference substance having a known molecular weight and distilled water is used as the solvent, and the value of the ordinate at the point where the extension of the line parallel to the ordinate of the so obtained calibration curve intersects the extension of the inclined line is read and the read value is designated as the Mlim value. Incidentally, since commercially available water-soluble standard polymers have a molecular weight lower than 2,000,000, a complete calibration curve cannot be obtained with respect to a gel having an Mlim value exceeding 2,000,000. Therefore, the Mlim value of such gel cannot precisely be determined, but the Mlim value is estimated from the intersecting point where the extension of the calibration curve determined with respect to molecular weights lower than 2,000,000 intersects the extension of the line parallel to the ordinate, which is determined under the same conditions with respect to a gel having a smaller Mlim value.

It is preferred that the non-specific adsorption of bio-substances to the matrix of the activated gel of the present invention be low so that the intended substance only can be specifically adsorbed to the gel. The degree of the non-specific adsorption of bio-substances to the gel matrix can be determined by first charging the gel matrix in a column, next passing an aqueous solution containing bio-substances through the column to contact the bio-substances with the gel matrix, and then measuring the amount of bio-substances which have flowed out without being adsorbed to the gel matrix. As the bio-substances to be used for the above-described purpose, there may be mentioned, for example, an amino acid and albumin which is one of the serum proteins.

The preferred ranges of the physical characteristics, such as specific surface area, water regain value and grain diameter, of the matrix of the activated gel of the present invention may be substantially the same as those of the activated gel of the present invention.

In another aspect of the present invention, there is provided a process for preparing a totally porous activated gel which comprises suspension polymerizing a vinyl carboxylate monomer and a crosslinkable monomer having at least two ethylenically unsaturated double bonds and/or an acetylenically unsaturated triple bond to form a copolymer, subjecting the copolymer to saponification or ester interchange reaction to obtain a hydroxyl group-containing copolymer, and reacting the hydroxyl group-containing copolymer with an epihalohydrin, a cyanogen halide and/or a diepoxy compound containing 4 to 10 carbon atoms.

Now, a preferred mode of the process for the preparation of the activated gel of the present invention will be described. Of course, the process for the preparation of the activated gel of the present invention is by no means limited to the process described below.

First, totally porous polymer grains having a three-dimensional cross-linked structure are prepared by subjecting to suspension polymerization in water a mixture comprising a vinyl carboxylate monomer, a crosslinkable monomer and a polymerization initiator. As the suitable crosslinkable monomer, there may be mentioned, for example, triazine derivatives such as triallyl isocyanurate and triallyl cyanurate, di(meth)acrylates such as ethylene glycol dimethacrylate and diethylene glycol dimethacrylate, polyvinyl ethers such as butanediol divinyl ether, diethylene glycol divinyl ether and tetravinylglyoxal, and polyallyl ethers such as diallylidene pentaerythrite and tetraallyloxyethane. They may be used alone or in mixture. From the viewpoints of the copolymerizability with vinyl carboxylate and the mechanical strength, fine pore structure and chemical stability of the resulting matrix, it is preferable to use a crosslinkable monomer of the formula

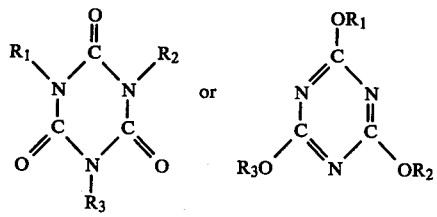

wherein $R_1$, $R_2$ and $R_3$ each independently represent $CH_2=CH-CH_2-$, $CH\equiv C-CH_2-$ or

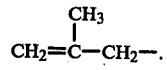

Of the above monomers, triallyl isocyanurate is particularly preferable.

The vinyl carboxylate monomer to be employed in the present process should contain one or more vinyl carboxylate groups. As the suitable vinyl carboxylate monomer, there may be mentioned, for example, vinyl acetate, vinyl propionate, divinyl adipate and other vinyl carboxylates containing 4 to 10 carbon atoms. They may be used alone or in mixture.

In addition to the above-mentioned crosslinkable monomer and vinyl carboxylate monomer, any copolymerizable monomer which does not adversely affect the physical characteristics of the resulting activated gel of the present invention, such as diethylene glycol ethylvinyl ether, may be added to form a gel matrix in the present process.

The suspension-polymerization in the process of the present invention is effected in such monomer proportions as give a copolymer having a degree of crosslinking ($X_2$) in the range satisfying an inequality $0.1 \leq X_2 \leq 0.4$, more preferably $0.15 \leq X_2 \leq 0.3$, said degree of crosslinking ($X_2$) being defined by the formula $$\frac{\frac{W_2}{M_2} \times n_2}{\frac{W_1}{M_1} \times n_1 + \frac{W_2}{M_2} \times n_2}$$

in which
$M_1$ represents the molecular weight of the vinyl carboxylate monomer,
$M_2$ represents the molecular weight of the crosslinkable monomer,
$W_1$ represents the weight of the vinyl carboxylate monomer used in the suspension polymerization,
$W_2$ represents the weight of the crosslinkable monomer used in the suspension polymerization,
$n_1$ represents the number of ethylenically unsaturated double bonds present in the vinyl carboxylate monomer, and
$n_2$ represents the number of ethylenically unsaturated double bonds and acetylenically unsaturated triple bonds present in the crosslinkable monomer.

The mode of polymerization is not critical, and a gel matrix to constitute the activated gel of the present invention may be formed according to any of the customary methods, inclusive of the solution polymerization, suspension polymerization and emulsion polymerization. However, the suspension polymerization method is preferred because it is suitable for forming spherical grains. In the suspension polymerization method, a copolymerizable monomer, e.g. vinyl carboxylate, and a crosslinkable monomer are stirred to form small particles in the presence of a solvent which dissolves the monomers and is hardly soluble in water, and the copolymerization reaction is carried out by heating. The resulting copolymer has permanent pores. As the suitable solvent which dissolves monomers to be used in the present process and is hardly soluble in water, there may be mentioned, for example, aromatic hydrocarbons such as toluene and xylene, aliphatic hydrocarbons such as heptane and octane, esters such as ethyl acetate, n-butyl acetate and n-hexyl acetate, ethers such as dibutyl ether, methyl isobutyl ketone and n-heptanol. It is preferred that 20 to 300 parts by weight of such a solvent be used per 100 parts by weight of the monomers present.

For controlling the fine pore size and fine pore size distribution, there may be employed a linear polymer, such as polyvinyl acetate or the like, in combination with the above-mentioned solvent. Such a linear polymer may be employed in an amount of 10 parts by weight or less per 100 parts by weight of the monomers employed. The combined use of the above-mentioned solvent and linear polymer facilitates formation of gels having greater pore diameter. Examples of the polymerization initiator employed in the present process include those which are customarily used, namely, 2,2'-azobisisobutyronitrile and benzoyl peroxide. In effecting the suspension polymerization, it is preferred that a customary suspension stabilizer of organic polymer be incorporated in the water phase. Further, according to need, a pH buffering agent, such as sodium phosphate, may be added to the water phase. It is possible to vary the grain size of the copolymer by varying the kind and quantity of the suspension stabilizer, the agitation speed and other polymerization reaction conditions.

Next, the granular copolymer obtained by the suspension polymerization described above is subjected to an ether-interchange or saponification reaction. By the ester-interchange or saponification reaction, the ester group of the vinyl carboxylate monomer unit present in the copolymer is converted to a hydroxyl group. The saponification or ester interchange reaction is effected to give a matrix having a vinyl alcohol monomer unit concentration ($q_{OH}$) of at least 5.0 meq/g but not exceeding a value given by the formula $$\frac{1000(1 - X_2)}{44 + 39X_2}$$

in which $X_2$ is as defined above and in the range satisfying an inequality $0.1 \leq X_20.4$.

The degree of conversion from ester groups to hydroxyl groups so that the vinyl alcohol monomer unit concentration ($q_{OH}$) may be within the preferred range as mentioned hereinbefore can be controlled by determining in advance the effect of reaction conditions, such as solvent, temperature and time on the conversion, and controlling the reaction conditions within the predetermined ranges in effecting the ester-interchange or saponification reaction. In the process of the present invention, the ester-interchange or saponification reaction may be carried out in a solvent, such as water, ethanol, a mixture thereof, or the like, containing an acid or alkali as a catalyst at temperatures, from 5° to 55° C., preferably from 10° to 50° C., more preferably from 15° to 45° C. The resulting gel matrix may be post-cured with a crosslinking agent, such as epichlorohydrin, butanediol glycidyl ether or the like, after the ester-interchange or saponification reaction.

Then, the gel matrix containing hydroxyl groups as a result of the above described ester-interchange or saponification reaction is reacted with an activating agent to link an reactive group to the gel matrix, thereby obtaining an activated gel of the present invention. The reactive group is linked to the gel matrix by a covalent bond with the oxygen atom of the hydroxyl group present in the gel matrix.

As the suitable activating agent employed in the present process, there may be mentioned, for example, cyanogen halides, bisepoxides containing 4 to 10 carbon atoms, epichlorohydrin, halotriazines, bromoacetyl bromide, ethyl chloroformate and 1,1'-carbonyldiimidazole.

A preferred mode of the activation reaction in the present process is described below using cyanogen bromide as an activating agent. An appropriate amount of the gel matrix is suspended in water under agitation. Then, an aqueous solution of cyanogen bromide is added to the suspension while adjusting the pH value of the suspension to 11 to 12 with aqueous sodium hydroxide under agitation. After completion of the reaction, the product is filtered using a glass filter and washed with water to obtain an activated gel having cyanate ester groups or imidocarbonate groups linked to the gel matrix. In substantially the same manner, the gel matrix is contacted with a bisepoxide or epichlorohydrin under alkali to obtain an activated gel having epoxy groups as reactive groups. The activation reaction using a halotriazine is also effected by contacting the gel matrix with the activating agent under alkali.

The so obtained activated gel of the present invention can bond thereto an organic substance having a reactive group, such as amino group, carboxyl group, hydroxyl group, thiol group or the like, by contacting the organic substance with the activated gel in a buffer. The bonding of such an organic substance to the activated gel should be effected under such conditions that will not cause the biological affinity of the organic substance to be lost. The bonding is generally carried out at 100° C. or less under pH 3 to 13. It is preferred that the optimum conditions for bonding reaction be selected according to the kind of the organic substance to be bonded. Examples of the organic substance are an antigen, antibody, enzyme, amino acid, oligopeptide, polypeptide and nucleic acid. It is to be understood that the expression "an organic substance" as used herein is intended to mean not only a single organic substance but also mixtures of organic substances. The activated gel of the present invention having such an organic substance bonded thereto is utilized to separate or remove another substance having biological affinity with the bonded organic substance by bringing them into contact.

The gel matrix of the activated gel of the present invention is partly characterized by the extremely low non-specific adsorption of bio-substances to the matrix. Therefore, when the activated gel of the present invention having a substance having biological affinity bonded thereto is utilized to separate or remove another substance having biological affinity with the bonded organic substance from a mixture containing said another substance by bringing them into contact, it is possible to specifically separate or remove said another substance intended to separate or remove. Therefore, the activated gel of the present invention can be utilized as a suitable packing material for the affinity chromatography. In addition, the activated gel of the present invention contains reactive groups at high concentration so that an increased amount of a substance having biological affinity can be bonded to the gel.

The activated gel of the present invention can sustain its original mechanical strength and pore structure without being affected by the solvent, modifying agent, pH and temperature employed in bonding a bio-substance to the reactive group of the gel matrix, or in contacting a bio-substance mixture with the bonded bio-substance to cause the bio-substance exhibiting biological affinity with the bonded bio-substance to be fixed to the bonded bio-substance while allowing the other bio-substances not exhibiting biological affinity with the bonded bio-substance to flow out, or in eluting the bio-substance fixed to the bonded bio-substance due to the affinity therebetween.

The activated gel of the present invention is totally porous so that substances to be separated or removed can be sufficiently diffused within the gel matrix. Accordingly, the gel of the present invention provides a large area of contact with substances, thereby enabling a remarkable improvement of the separating capacity.

The activated gel of the present invention has sufficient mechanical strength so that it is not destroyed during the step of gel activation, viz. incorporation of reactive groups onto the gel matrix, and the step of bonding a bio-substance to the incorporated reactive groups.

Furthermore, the activated gel of the present invention having a substance exhibiting biological affinity bonded thereto is often packed in a column to utilize for separating or removing another substance exhibiting biological affinity with the bonded substance. The activated gel of the present invention is sufficiently rigid so that a liquid containing a substance to be separated or removed can be passed through the column under pressures only slightly higher than the atmospheric pressure. Therefore, the activated gel of the present invention ensures much greater resolving efficiency than the conventional agarose gel and semi-rigid polyvinyl gel having primary hydroxyl groups.

The activated gel of the present invention is suitably utilized to remove specific humoral substances. For example, it can be suitably utilized for the medical treatment by extracorporeal perfusion, in which blood is led outside the body and blood is contacted with the substance which exhibits biological affinity with the intended substance of the blood and is bonded to the reactive groups of the activated gel packed in a column. Heretofore, various attempts have been made to apply the extracorporeal perfusion method to cure autoimmune disease or te like. However, every attempt made has been found to produce only unsatisfactory results due to the absence of suitable material for linking substances exhibiting biological affinity. It is of crucial importance that any material utilized for extracorporeal perfusion can be subjected to sterilization and that a liquid can be passed through the material at a high flow rate without causing an unfavorable pressure increase. Agarose gels (for example, "Sepharose" manufactured and sold by Pharmacia Fine Chemicals, Inc., Sweden) activated with cyanogen bromide have been tested for use as the material for extracorporeal perfusion. However, freeze-drying sterilization cannot readily be applied to agarose gels. Further, neither radiation sterilization nor heat sterilization can be applied to agarose gels, as mentioned hereinbefore. In addition, agarose gels are soft so that blood cannot be passed at a high rate, whereby agarose gels are not suitable for the medical treatment by extracorporeal perfusion. Similarly conventional semi-rigid polyvinyl gels having primary hydroxyl groups cannot suitably be utilized for the medical treatment by extracorporeal perfusion because blood cannot be passed therethrough at a high rate without causing an unfavorable pressure increase.

The activated gel of the present invention can be subjected to freeze drying sterilization, radiation sterilization and heat sterilization. It is rigid so that blood can be passed at a high rate without causing an unfavorable pressure increase. It should be noted that the activated gel of the present invention will greatly contribute to the progress of the medical treatment by extracorporeal perfusion owing to the above described advantages thereof.

The present invention will be illustrated in more detail with reference to the following Examples, which should not be construed to be limiting the scope of the present invention.

EXAMPLE 1

Into a three-necked round-bottom flask having a capacity of 2 liters were charged a homogeneous liquid mixture consisting of 100 g of vinyl acetate, 24.1 g of triallyl isocyanurate (degree of crosslinking: 0.20), 124 g of ethyl acetate, 124 g of heptane, 3.1 g of polyvinyl acetate having a polymerization degree of 500 and 3.1 g of 2,2-azobisisobutyronitrile and 400 ml of water containing, dissolved therein, 1% by weight of polyvinyl alcohol 0.05% by weight of sodium dihydrogen phosphate dihydrate and 1.5% by weight of disodium hydrogen phosphate dodecahydrate, and the resulting mixture was sufficiently stirred. Then, the mixture was heated at 65° C. for 18 hours and at 75° C. for 5 hours while stirring to effect suspension polymerization, so that a granular copolymer was obtained. The copolymer thus obtained was filtered and washed with water and then with acetone so that the residual monomers and the organic solvent were extracted. The granular copolymer was added to a solution consisting of 2 liters of methanol and 46.5 g of sodium hydroxide and heated at 40° C. for 18 hours to effect ester interchange reaction of the copolymer. The resulting grains were found to have an average grain diameter of 150 μm. The vinyl alcohol monomer unit concentration ($q_{OH}$) as measured according to the method described before was 13 meq.g. The $W_R$ value of the obtained gel as determined according to the method described before was 4.4 g/g. The specific surface area of the gel in the dry state as determined according to the BET method using nitrogen gas was 10 m$^2$/g.

The gel so obtained was packed in a stainless steel column of 7.5 mm in inner diameter and 25 cm in length. Aqueous solutions respectively of various dextrans differing in molecular weight and various polyethylene glycols differing in molecular weight are passed through the column, and then eluted using distilled water as an eluent. It was found that both the dextrans and the polyethylene glycols flowed out in the order of molecular weight, i.e. from higher molecular weight to lower molecular weight. The molecular weight exclusion limit (Mlim) value which was determined, according to the method described before, with respect to dextran as the standard material (hereinafter referred to as "dextran-Mlim") was about $3 \times 10^5$. In determining the dextran-Mlim value, "Hitachi Model 635A" (trade name of an apparatus consisting of a sample-injector and a pump, manufactured and sold by Hitachi Ltd., Japan) and "Shodex RI Model SE-11" (trade name of a detector manufactured and sold by Showadenko K.K., Japan) were used. Three kinds of aqueous solutions, namely (1) an aqueous solution containing 1% by weight of γ-globulin, 0.3 M of sodium chloride and 0.1 M of sodium phosphate, (2) an aqueous solution containing 1% by weight of bovine serum albumin, 0.3 M of sodium chloride and 0.1 M of sodium phosphate, and (3) an aqueous solution containing 1% by weight of egg albumin, 0.3 M of sodium chloride and 0.1 M of sodium phosphate were, at 20° C., passed through the same packed column as mentioned above, in sequence. After each passage of the solution, elution was conducted using an aqueous solution of 0.3 M of sodium chloride and 0.1 M of sodium phosphate as an eluent. The samples flowing out from the column were analyzed using the "Hitachi Multi Wave length UV Monitor" (trade name of an apparatus manufactured and sold by Hitachi Ltd., Japan) to determine the recovery rates of γ-globulin, bovine serum albumin and egg albumin. The recovery rate of each bio-substance was almost 100% and non-specific adsorption of bio-substances to the gel was extremely small. All the above-mentioned samples were passed through the packed column at a flow rate of 1 ml/min.

50 cc of the ester interchanged gel washed sufficiently with water was dispersed in 200 ml of water and then 3 g of cyanogen bromide was added, followed by stirring. Using a 2 N aqueous sodium hydroxide solution, the pH of the resulting mixture was maintained at 10 to 11 and the reaction was carried out for 8 minutes. After completion of the reaction, the product was quickly filtered using a glass filter and then washed with 2 liters of water to obtain an activated gel. The reactive group concentration of the activated gel as measured according to the Wilchek et al method [see J. Kohn, M. Wilchek Biochem. Biophys, Res. Commun., 84 7 (1978)] was 2000 μmol per g of the activated gel in the dry state.

EXAMPLE 2

A homogeneous liquid mixture consisting of 100 g of vinyl acetate, 32.3 g of triallyl isocyanurate (degree of crosslinking: 0.25), 100 g of ethyl acetate, 100 g of n-heptanol, 6.6 g of poly(vinyl acetate) having a polymerization degree of 500 and 3.3 g of 2,2'-azobisisobutyronitrile was suspension polymerized in the same manner as described in Example 1. The obtained grains were subjected to ester interchange reaction in the same manner as described in Example 1 except that the reaction was carried out in a solution consisting of 2.1 liters of methanol and 46.5 g of sodium hydroxide. The obtained gel was found to have an average grain diameter of 100 μm, a $q_{OH}$ value of 12 meq/g, a $W_R$ value of 3.4 g/g and a specific surface area of 20 m$^2$/g in the dry state.

In the same manner as described in Example 1, the gel was packed in a column. Aqueous solutions respectively of various dextrans differing in molecular weight and various polyethylene glycols differing in moleuclar weight were passed through the column. It was confirmed that both the dextrans and the polyethylene glycols flowed out in the order of molecular weight, i.e. from higher molecular weight to lower molecular weight. The dextran-Mlim value was about $7 \times 10^5$. In the same manner as described in Example 1, three kinds of aqueous solutions, namely, an aqueous solution containing γ-globulin, an aqueous solution containing bovine serum albumin and aqueous solution containing egg albumin were passed through the same packed column as mentioned above, respectively. The recovery rates of γ-globulin, bovine serum albumin and egg albumin were almost 100% and non-specific adsorption of bio-substances to the gel was extremely small.

The gel was activated with cyanogen bromide in the same manner as described in Example 1. The reactive group concentration of the obtained activated gel as measured in the same manner as in Example 1 was 1500 μmol per g of the activated gel in the dry state.

EXAMPLE 3

After 50 cc of the ester interchanged gel obtained by the ester interchange reaction in Example 2 was sufficiently washed with water, a solution consisting of 50 ml of 1,4-butanediol diglycidyl ether, 100 mg of sodium boron hydride and 50 ml of 0.6 M aqueous sodium hydroxide solution was added to the gel. The resulting mixture was shook at room temperature for 8 hours so that reaction was carried out. Then, the product was filtered using a glass filter and washed sufficiently with water to obtain an activated gel. The reactive group concentration of the activated gel as measured according to the Sundbery et al method [see J. Chromatogr., 90, 87 (1974)] was 900 μmol per g of the activated gel in the dry state.

EXAMPLE 4

After 50 cc of the ester interchanged gel obtained by the ester interchange reaction in Example 2 was sufficiently washed with water, the gel was charged into a flask. Then, 75 ml of water, 32.5 g of 2M aqueous sodium hydroxide solution and 7.5 ml of epichlorohydrin were charged into the flask in sequence. The resulting liquid mixture was shook at 40° C. for 2 hours. Then, the product was filtered using a glass filter and washed sufficiently with water to obtain an activated gel. The reactive group concentration of the activated gel as measured in the same manner as in Example 3 was 500 μmol per g of the activated gel in the dry state.

EXAMPLE 5

50 cc of the activated gel obtained in Example 2 was washed with 500 ml of a 0.1 M aqueous sodium bicarbonate solution. 150 ml of a 0.1 M aqueous sodium bicarbonate solution containing, dissolved therein, 5 g of L-arginine hydrochloride was adjusted to have a pH value of 9.5 using an aqueous sodium hydroxide solution. The obtained solution was added to the activated gel. Then, the gel was shook at 25° C. for 16 hours. The resulting product was filtered using a glass filter. The adsorbent thus obtained was washed with water and 200 ml of a 1 M aqueous sodium chloride solution alternately.

The determination of the amount of bonded L-arginine was conducted by a method which comprises the steps of: first, adding 8-hydroxyquinoline and N-bromosuccinimide to the supernatant liquid obtained by the above-mentioned filtration to cause color development, secondly measuring the absorbance of the supernatant liquid at 500 nm to obtain a concentration of L-arginine contained therein using the above-mentioned 0.1 M aqueous sodium bicarbonate solution of L-arginine as a reference, thirdly calculating the amount of L-arginine present in the supernatant liquid on the basis of the thus obtained concentration of L-arginine, and finally subtracting the resulting amount of L-arginine present in the supernatant liquid from the amount of charged L-arginine. Thus, it was found that L-arginine was bonded to the activated gel in an amount of 1.40 mmol per g of the activated gel.

The above-obtained gel was packed in a stainless steel column of 7.5 mm in inner diameter and 25 cm in length to form a 25 cm gel bed, and an aqueous solution containing buffer salts was passed through the column at 20° C. The solution could be passed through the column under a pressure of 5 kg/cm$^2$ or less at a flow rate of 140 mlcm$^{-2}$hr$^{-1}$. This packed column was freeze-dried under vacuum and put in a sterilization bag. Into the sterilization bag was introduced a gas mixture consisting of 35% of ethylene oxide and 65% of carbon dioxide. After the sterilization bag was heated at 40° C. for 5 hours, replacement of the gas mixture in the bag with air was performed for 1 hour, so that a gel packed column which was sterilized and dried was obtained. The sterilized dried gel in the column could be swollen to the extent that the volume of the swollen gel was almost equal to the volume that the gell had prior to the freeze-drying operation.

EXAMPLE 6

A homogeneous liquid mixture consisting of 100 g of vinyl acetate, 52 g of triallyl isocyanurate (degree of crosslinking: 0.35), 100 g of ethyl acetate, 100 g of heptane, 7.5 g of polyvinyl acetate having a polymerization degree of 500 and 3.8 g of 2,2'-azobisisobutyronitrile was suspension polymerized in the same manner as in Example 1 except that 500 ml of water containing, dissolved therein, 1% by weight of polyvinyl alcohol, 0.05% by weight of sodium dihydrogen phosphate dihydrate and 1.5% by weight of disodium hydrogen phosphate dodecahydrate instead of 400 ml of water containing, dissolved therein, 1% by weight of polyvinyl alcohol, 0.05% by weight of sodium dihydrogen phosphate dihydrate and 1.5% by weight of disodium hydrogen phosphate dodecahydrate. The obtained grains were subjected to ester interchange reaction in the same manner as in Example 1 except that the reaction was carried out in a solution consisting of 2.4 liters of methanol and 46.5 g of sodium hydroxide.

The obtained gel was found to have an average grain diameter of 300 μm, a $q_{OH}$ value of 9.0 meq/g, a $W_R$ value of 4.0 g/g and a specific surface area of 60 m$^2$/g in the dry state. The dextran-Mlim value of the gel was about $6 \times 10^5$.

The gel was activated using cyanogen bromide in the same manner as in Example 1. The reactive group concentration of the obtained activated gel as measured in the same manner as in Example 1 was 500 'μmol per g of the activated gel in the dry state.

EXAMPLE 7

A homogeneous liquid mixture consisting of 90 g of divinyl adipate, 30 g of triallyl isocyanurate (degree of crosslinking: 0.29), 200 g of ethyl acetate and 3.0 g of 2,2'-azobisisobutyronitrile was suspension polymerized in the same manner as in Example 1. The obtained grains were subjected to ester interchange reaction in the same manner as in Example 1. The obtained gel was found to have an average grain diameter of 150 μm, a $q_{OH}$ value of 10 meq/g, a $W^R$ value of 4.0 g/g and a specific surface area of 40 m$^2$/g in the dry state. The dextran-Mlim value of the gel was about $30 \times 10^5$.

In the same manner as in Example 1, three kinds of aqueous solutions, namely, an aqueous solution containing γ-globulin, an aqueous solution containing bovine serum albumin and an aqueous solution containing egg albumin were passed through the column packed with the gel, respectively. The recovery rate of each bio-substance was almost 100% and non-specific adsorption of bio-substances to the gel was very low.

In the same manner as in Example 1, the gel was activated with cyanogen bromide. The reactive group concentration of the obtained activated gel as measured in the same manner as in Example 1 was 800 μmol per g of the activated gel in the dry state. EXAMPLE 8

A homogeneous liquid mixture consisting of 100 g of vinyl acetate, 39.4 g of diethylene glycol divinyl ether (degree of crosslinking: 0.3), 100 g of ethyl acetate and 3.5 g of 2,2'-azobisisobutyronitrile was suspension polymerized in the same manner as in Example 1. The obtained grains were subjected to ester interchange reaction in the same manner as in Example 1. The obtained gel was found to have an average grain diameter of 300 μm, a $q_{OH}$ value of 10.0 meq/g, a $W_R$ value of 2.0 g/g and a specific surface area of 40 m$^2$/g in the dry state. The dextran-Mlim value of the gel was about $10 \times 10^5$.

In the same manner as in Example 1, three kinds aqueous solutions, namely, an aqueous solution containing γ-glubulin, an aqueous solution containing bovine serum albumin and an aqueous solution containing egg albumin were passed through the column packed with the gel, respectively. The recovery rate of each bio-substance was almost 100% and non-specific adsorption of bio-substances to the gel was very low.

In the same manner as in Example, the gel was activated using cyanogen bromide. The reactive group concentration of the obtained activated gel as measured in the same manner as in Example 1 was 700 μmol per g of the activated gel in the dry state.

COMPARATIVE EXAMPLE 1

50 cc of Sepharose CL-4B (trade name of agarose manufactured and sold by Pharmacia Fine Chemicals, Inc., Sweden) was activated in the same manner as in Example 1. The obtained activated gel was reacted with L-arginine hydrochloride to obtaine a L-arginine-bonded gel in the same manner as in Example 5. It was found that L-arginine was bonded to the gel in an amount of 1.00 mmol per g of the gel. In the same manner as in Example 5, a column packed with the L-arginine-bonded gel was freeze-dried under vacuum and sterilized. The sterilized dried gel in the column was swollen only to the extent that the volume of the swollen gel was 30% of the volume that the gel had prior to the freeze-drying operation.

COMPARATIVE EXAMPLE 2

A homogeneous liquid mixture consisting of 100 g of vinyl acetate, 5.1 g of triallyl isocyanurate (degree of crosslinking: 0.05), 150 g of ethyl acetate, 150 g of heptane and 3.1 g of 2,2'-azobisisobutyronitrile was suspension polymerized in the same manner as in Example 1. The obtained grains were subjected to ester interchange reaction in the same manner as in Example 1. The obtained gel was found to have an average grain diameter of 100 μm, a $q_{OH}$ value of 19meq/g, a $W_R$ value of 5.0 g/g and a specific surface area of 2 m$^2$/g in the dry state.

In the same manner as in Example 1, the gel was packed in columns. Under the same conditions as in Example 1, it was tried to pass aqueous solutions respectively of various dextrans differing in molecular weight and various polyethylen glycols differing in molecular weight, an aqueous solution containing γ-globulin, an aqueous solution containing bovine serum albumin and an aqueous solution containing egg albumin through the column, respectively. But the pressure loss in the packed layer was so great that the determinations of dextran-Mlim and recovery rates of the bio-substances could not be carried out.

EXAMPLE 9

A homogeneous liquid mixture consisting of 100 g of vinyl acetate, 41 g of triallyl isocyanurate (degree of crosslinking: 0.30), 70 g of ethyl acetate, 70 g of octane 7 g of polyvinyl acetate having a polymerization degree of 500 and 3.5 g of 2,2'-azobisisobutyronitrile was suspension polymerized in the same manner as in Example 1. The obtained grains were subjected to ester interchange reaction in the same manner as in Example 1. The obtained gel was found to have an average grain diameter of 70 μm, a $q_{OH}$ value of 7 meq/g, a $W_R$ value of 3.0 g/g and a specific surface area of 45 m$^2$/g in the dry state. The dextran-Mlim was about $3 \times 10^5$.

In the same manner as in Example 4, the gel was activated using epichlorohydrin. The reactive group concentration of the activated gel as measured according to the Sundbery et al method in Example 3 was 500 μmol per g of the activated gel in the dry state.

The activated gel was dispersed in water as a dispersing medium and introduced into a column of 10 mm in diameter, which column was equipped with a glass filter and an outlet stopcock at the bottom. The outlet stopcock had been closed before the gel was introduced into the column. After the introduction of the gel into the column, the outlet stopcock was opened, and the water used as the dispersing medium was allowed to flow by the action of gravity so that the gels were sedimented in the column. The height of the formed gel bed was 5 cm. Then, a tube from a peristaltic pump was connected to the top of the column, and pure water was introduced into the column through the tube. In FIG. 1 is shown the relationship between the flow rate [ml/min] of pure water and the differential pressure [mmHg] between the inlet of the column and the outlet of the column. In FIG. 2 is shown the relationship between the volume of the gel packed in the column and the differential pressure [mmHg] between the inlet of the column and the outlet of the column. The relationships with respect to the present invention are indicated by A in FIGS. 1 and 2. In FIG. 2, the volume of the gel of the present invention in the column is expressed in terms of relative value to the value (100) of the volume of the gel bed formed by gravity-flow of the water used as the dispering medium.

For comparison, an activated gel prepared by activating "TOYOPEARL" [trade name of semi-rigid polyvinyl gel (having a grain diameter of 50 to 100 μm and having primary hydroxyl groups) manufactured and sold by Toyosoda Manufacturing Co. Ltd., Japan] with epichlorohydrin in the same manner as in Example 4 was packed in a column in the same manner as described above. The relationship between the flow rate of pure water and the differential pressure between the inlet and the outlet of the column and the relationship between the relative volume of the gel packed in the column and the differential pressure between the inlet and the outlet of the column were examined. The results are indicated by B in FIGS. 1 and 2. Further, "Epoxy-activated Sepharose 6B" [trade name of epoxy activated agarose gel (having a grain diameter of 60 to 140 μm) manufactured and sold by Pharmacia Fine Chemicals, Inc., Sweden] was also packed in a column in the same manner as described above and the relationship between the flow rate of pure water and the differential pressure between the inlet and the outlet of the column and the relationship between the relative volume of the gel packed in the column and the differential pressure between the inlet and the outlet of the column were examined. The results are indicated by C in FIGS. 1 and 2. With respect to the gel prepared by activating "TOYOPEARL" with epichlorohydrin, the volume of the gel bed is expressed in terms of relative value to the value (100) of the volume of the gel bed formed by gravity-flow of the water used as the dispersing medium. With respect to the gel "Sepharose", the volume of the gel bed is expressed in terms of relative value to the value (100) of the volume of the gel bed formed by gravity-sedimentation while leaving the outlet stopcock closed.

From FIGS. 1 and 2, it is apparent that the gel of the present invention is very rigid as compared with the currently available gels, and liquid can be passed at a high speed under low pressure through the column in the case where the gel of the present invention is used as compared with the case where the currently available gels are used.

EXAMPLE 10

100 cc of the granular porous copolymer (average grain diameter: 150 μm, $q_{OH}$: 13 meq/g, $W_R$: 4.4 g/g, specific surface area: 10 m$^2$/g) as obtained in Example 1 was washed well with distilled water, and suspended in 100 ml of distilled water. To the suspension was dropwise added aqueous 4 N sodium hydroxide to adjust the pH of the suspension to 11.0-11.5, while agitating with a mechanical stirrer. Then, 10 g of powdery cyanogen bromide was added to the suspension. The pH of the suspension was maintained at 11.0 to 11.5 by dropwise adding aqueous 4 N sodium hydroxide and the reaction was effected for 8 minutes to obtain an activated gel. After completion of the reaction, the mixture was quickly filtered using a glass filter and washed with 5 liters of an ice-cooled aqueous 0.1 M sodium carbonate buffer. The whole product was suspended in 100 ml of an ice-cooled aqueous 0.1 M sodium carbonate buffer. To the suspension was added a solution dissolving 2 g of the IgG fraction of anti-rabbit albumin (goat) (produced and sold by Cappel Laboratories, Inc., Pennsylvania, U.S.A.) in 20 ml of an aqueous 0.1 M sodium carbonate buffer under agitation. The mixture was stirred at 4° C. for 20 hours to effect bonding of the albumin to the activated gel. After completion of the reaction, the mixture was filtered using a glass filter, and washed well with an aqueous 0.01 M sodium phosphate buffer (pH 7.5) containing 0.15 M of sodium chloride. The amount of bonded anti-rabbit albumin IgG was determined by measuring the absorbance at 280 nm of the filtrate obtained upon the washing and found to be about 1.98 g/100 cc of the activated gel, which was almost 100% based on the charged amount of 2 g.

The resulting activated gel having anti-rabbit albumin IgG bonded thereto was used to isolate albumin from rabbit serum. Namely, the gel was packed in a stainless steel column of 2.5 cm in inner diameter and 20 cm in length, and washed well with an aqueous 0.01 M sodium phosphate buffer containing 0.15 M of sodium chloride. Then, 200 ml of rabbit serum was passed through the column at a flow rate of 10 cm/hr. The gel was washed well with the above-mentioned phosphate buffer by passing the buffer through the column, and eluted with a hydrochloric acid buffer containing 0.1 M of glycine. The effluent was quickly neutralized with a 1 M glycine buffer of pH 11.5. The resulting mixture was subjected to dialysis using a 0.01 M sodium phosphate buffer containing 0.15 M of sodium chloride at 4° C. overnight, measurement of the absorbance at 280 nm, determination of protein content according to the Lowry et al method and disc electrophoresis using acrylamide to identify the rabbit albumin contained and determine the amount thereof. 215 mg of rabbit albumin having a purity of 98% was obtained. It was really surprising that only a slight amount of impurities was present in the obtained albumin despite that the rabbit serum containing multiple components was subjected to direct separation to isolate rabbit albumin. Further, the gel in the column was washed and eluted with aqueous 8 M urea. In the effluent was no longer found any trace of protein components.

EXAMPLE 11

250 cc of the granular porous copolymer (average grain diameter: 150 μm, $q_{OH}$: 13 meq/g, $W_R$: 4.4 g/g, specific surface area: 10 m$^2$/g) as obtained in Example 1 was washed well with distilled water, and immersed in 500 ml of dimethyl sulfoxide overnight. The mixture was suction filtered using a glass filter, and suspended in a dimethyl sulfoxide solution of 500 ml containing 198 ml (2.5 moles) of epichlorohydrin. To the suspension was dropwise added 45 ml of aqueous 50% by weight sodium hydroxide over a period of 2 hours under agitation. The mixture was stirred at 30 to 35 ° C. for 4 hours to obtain an epoxy-activated gel. After completion of the reaction, the mixture was quickly filtered using a glass filter, and washed with 700 ml of dimethyl sulfoxide, subsequently 700 ml of acetone and then 3 liters of distilled water. Using the epoxy-activated gel thus obtained, a gel having rabbit albumin bonded thereto for isolating anti-rabbit albumin antibody was prepared according to customary procedures (reference may be made to "Affinity Chromatography" edited by M. Yamazaki, S. Ishii and K. Iwai and published by Kodansha K.K., Japan, 1975). Namely, 10 cc of the epoxy-activated gel was suspended in 10 ml of an aqueous 0.1 M sodium carbonate buffer. To the suspension was added 2 ml of an aqueous 0.1 M sodium carbonate buffer containing 30 mg of rabbit albumin. The reaction was allowed to proceed at room temperature for 1 hour with occasional stirring, to bond the rabbit albumin to the gel. After completion of the reaction, the mixture was filtered using a glass filter, and washed well with an aqueous 0.01 M sodium phosphate buffer (pH 7.5) containing 0.15 M of sodium chloride. The amount of bonded rabbit albumin was determined in substantially the same manner as in Example 10 and found to be as large as about 28 mg.

The resulting activated gel having rabbit albumin bonded thereto was packed in a stainless steel column and used to isolate anti-rabbit albumin antibody from anti-rabbit albumin (goat) serum in substantially the same manner as in Example 10. The isolated antibody was a high-purity IgG protein of a high activity.

What is claimed is:

1. A totally porous activated gel which comprises:
   a matrix of a totally porous crosslinked copolymer comprising as main components vinyl alcohol monomer units and crosslinkable monomer units and having a specific surface area of 5 to 1000 m$^2$/g, and
   a reactive group linked to said matrix by a covalent bond,
   said reactive group being defined as a functional group capable of effecting addition or substitution reaction with a nucleophilic reactive group having an active hydrogen in a medium having a hydrogen ion concentration of 3 to 13 in terms of pH value at a temperature of 0 to 100° C. to form a covalent bond between said reactive group and said nucleophilic reactive group.

2. An activated gel according to claim 1, wherein the gel has a reactive group concentration of 300 to 3000 μmol/g and a water regain value ($W_R$) of 0.5 to 6.0 g/g.

3. An activated gel according to claim 1, wherein said matrix has a molecular weight exclusion limit (Mlim) pf $10^3$ to $10^8$ and said reactive agroup is linked to said matrix by a covalent bond through a —O— group derived from the hydroxyl group of the vinyl alcohol monomer unit of said matrix.

4. An activated gel according to claim 1, wherein the crosslinkable monomer unit is a unit derived from a crosslinkable monomer having at least two ethylenically unsaturated double bonds and/or an acetylenically unsaturated triple bond.

5. An activated gel according to claim 1, wherein the matrix comprises vinyl alcohol monomer units, vinyl carboxylate monomer units and crosslinkable monomer units derived from a crosslinkable monomer having at least two ethylenically unsaturated double bonds and/or an acetylenically unsaturated triple bond, and wherein said matrix has a degree of crosslinking ($X_1$) in the range satisfying an inequality $0.1 \leq X_1 \leq 0.4$, said degree of crosslinking ($X_1$) being defined by the formula $$\frac{n_2 c}{a + n_1 b + n_2 c}$$

in which
   a represents the number of moles of said vinyl alcohol monomer units,
   b represents the number of moles of said vinyl carboxylate monomer units,
   c represents the number of moles of said crosslinkable monomer units, $n_1$ represents the number of vinyl groups present in said vinyl carboxylate monomer units, and
$n_2$ represents the number of ethylenically unsaturated double bonds and acetylenically unsaturated triple bonds present in said crosslinkable monomer units.

6. An activated gel according to claim 5, wherein the matrix has a vinyl alcohol monomer unit concentration ($q_{OH}$) of at least 5.0 meq/g but not exceeding a value given by the formula $$\frac{1000(1 - X_1)}{44 + 39 X_1}$$

in which $X_1$ is as defined above and in the range satisfying an inequality $0.1 \leq X_1 \leq 0.4$.

7. An activated gel according to claim 4 to 6, wherein the crosslinkable monomer unit contains a cyanurate and/or isocyanurate ring.

8. An activated gel according to claim 7, wherein the crosslinkable monomer unit is a unit derived from a crosslinkable monomer of the formula:

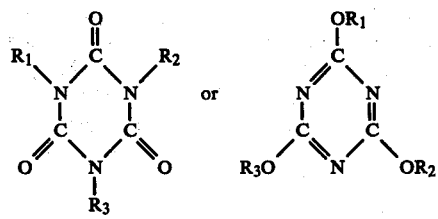

wherein $R_1$, $R_2$ and $R_3$ each independently represent $CH_2=CH-CH_2-$, $CH\equiv C-CH_2-$ or

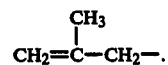

9. An activated gel according to claim 8, wherein the crosslinkable monomer unit is a unit derived from triallyl isocyanurate.

10. An activated gel according to claim 9, wherein the vinyl carboxylate monomer units each contain 4 to 10 carbon atoms.

11. An activated gel according to claim 10, wherein the vinyl carboxylate monomer units are units derived from vinyl acetate.

12. An activated gel according to claim 1, wherein the reactive group is a member selected from the group consisting of a cyanate ester group, an inidocarbonate group and an epoxy group containing 3 to 10 carbon atoms.

13. An activated gel according to claim 1, wherein the gel has a weight average grain diameter of 5 to 1000 μm.

14. A process for preparing a totally porous activated gel which comprises suspension polymerizing a vinyl carboxylate monomer and a crosslinkable monomer having at least two ethylenically unsaturated double bonds and/or an acetylenically unsaturated triple bond to form a copolymer, subjecting the copolymer to saponification or ester interchange reaction to obtain hydroxyl group-containing copolymer, and reacting the hydroxyl group containing copolymer with an epihalohydrin, a cyanogen halide and/or a diepoxy compound containing 4 to 10 carbon atoms.

15. A process according to claim 14, wherein said suspension polymerization is effected in such monomer proportions as give a copolymer having a degree of crosslinking ($X_2$) in the range satisfying an inequality $0.1 \leq X_2 \leq 0.4$, more preferably $0.15 \leq X_2 \leq 0.3$, said degree of crosslinking ($X_2$) being defined by the formula $$\frac{\frac{W_2}{M_2} \times n_2}{\frac{W_1}{M_1} \times n_1 + \frac{W_2}{M_2} \times n_2}$$

in which $M_1$ represents the molecular weight of the vinyl carboxylate monomer, $M_2$ represents the molecular weight of the crosslinkable monomer, $W_1$ represents the weight of the vinyl carboxylate monomer used in the suspension polymerization, $W_2$ represents the weight of the crosslinkable monomer used in the suspension polymerization, $n_1$ represents the number of ethylenically unsaturated couble bonds present in the vinyl carboxylate monomer, and $n_2$ represents the number of ethylenically unsaturated double bonds and acetylenically unsaturated triple bonds present in the crosslinkable monomer.

16. A process according to claim 15, wherein the saponification or ester interchange reaction is effected to such an extent that the resulting matrix has a vinyl alcohol monomer unit concentration ($q_{OH}$) *of at least* 5.0 meq/g but not exceeding a value given by the formula $$\frac{1000(1 - X_2)}{44 + 39 X_2}$$

in which $X_2$ is as defined above and in the range satisfying an inequality $0.1 \leq X_2 \leq 0.4$.

17. A process according to claim 14, wherein the crosslinkable monomer contains a cyanurate and/or isocyanurate ring.

18. A process according to claim 17, wherein the crosslinkable monomer has a structure of the formula:

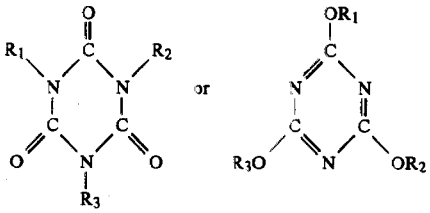

wherein $R_1$, $R_2$ and $R_3$ each independently represents $CH_2=CH-CH_2-$, $CH\equiv C-CH_2-$ or

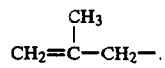

19. A process according to claim 18, wherein the crosslinkable monomer is triallyl isocyanurate.

20. A process according to claim 14, wherein the vinyl carboxylate monomer contains 4 to 10 carbon atoms.

21. A process according to claim 20, wherein the vinyl carboxylate monomer is vinyl acetate.

* * * * *

UNITED STATES PATENT AND TRADEMARK OFFICE
CERTIFICATE OF CORRECTION

PATENT NO. : 4,452,918
DATED : June 5, 1984
INVENTOR(S) : Takateru Uchida et al

It is certified that error appears in the above-identified patent and that said Letters Patent is hereby corrected as shown below:

| | |
|---|---|
| Col. 4, line 22 | Delete "grop" and substitute --group-- |
| Col. 5, line 59 | Delete "distirubted" and substitute --distributed-- |
| Col. 13, line 1 | Delete "te" and substitute --the-- |
| Col. 13, line 66 | Delete "meq.g" and substitute --meq/g-- |
| Col. 15, line 19 | Before "aqueous" insert --an-- |
| Col. 16, line 39 | Delete "gell" and substitute --gel-- |
| Col. 17, line 2 | After "50$0$" delete "'" |
| Col. 17, line 14 | Delete "$W^R$" and substitute --$W_R$-- |
| Col. 17, line 29 | Center "EXAMPLE 8" |
| Col. 21, line 37 | Delete "pf" and substitute --of-- |
| Col. 21, line 38 | Delete "agroup" and substitute --group-- |
| Col. 22, line 16 | After "claim 4" delete "to 6" |
| Col. 22, line 51 | Delete "inidocarbonate" and substitute --imidocarbonate-- |
| Col. 22, line 64 | After "obtain" insert --a-- |
| Col. 23, line 26 | Delete "couble" and substitute --double-- |

Signed and Sealed this

Sixth Day of November 1984

[SEAL]

Attest:

GERALD J. MOSSINGHOFF

*Attesting Officer*  *Commissioner of Patents and Trademarks*